United States Patent [19]

Hennings et al.

[11] Patent Number: 5,520,900
[45] Date of Patent: May 28, 1996

[54] METHOD OF MANUFACTURING A FINE MONODISPERSE OXIDE POWDER, A FINE MONODISPERSE OXIDE POWDER, A CERAMIC COMPOSITION AND THEIR USE OF SAME

[75] Inventors: Detlev Hennings; Rainer Waser, both of Aachen; Peter Scharff, Clausthal-Zellerfeld, all of Germany

[73] Assignee: U.S. Philips Corporation, New York, N.Y.

[21] Appl. No.: 323,208

[22] Filed: Oct. 14, 1994

[30] Foreign Application Priority Data

Oct. 16, 1993 [DE] Germany ........................ 43 35 395.9

[51] Int. Cl.⁶ .................................................. C01B 31/04
[52] U.S. Cl. .................. 423/448; 423/460; 264/DIG. 25; 252/506
[58] Field of Search ..................... 423/448, 460; 501/123; 252/502, 506; 254/DIG. 25

[56] References Cited

U.S. PATENT DOCUMENTS

| | | | |
|---|---|---|---|
| 4,414,142 | 11/1983 | Vogel | 252/511 |
| 4,565,649 | 1/1986 | Vogel | 423/448 |
| 4,749,664 | 6/1988 | Ross | 501/1 |
| 4,795,591 | 1/1989 | Fujimoto et al. | 423/448 |
| 4,885,120 | 12/1989 | McQuillan et al. | 264/60 |
| 4,908,338 | 3/1990 | Ross | 501/1 |
| 4,931,213 | 6/1990 | Cass | 252/507 |

FOREIGN PATENT DOCUMENTS 0169916  9/1984  Japan ..................... 423/448

*Primary Examiner*—Paul Marcantoni
*Attorney, Agent, or Firm*—Norman N. Spain

[57] ABSTRACT

Fine, monodisperse oxide powders can be manufactured by means of a method which does not require expensive production facilities, in which method

- a graphite intercalation compound is manufactured by reacting one or more chemical starting compounds of one or more elements of the groups Ib, IIa, IIb, IIIa, IIIb, IVa, IVb, Va, Vb, VIa, VIb, VIIb, VIII of the periodic table as well as of the lanthanides and actinides with a graphitic carbon modification having a grain size $\leq 150$ μm, and
- the graphite intercalation compound is converted by an oxidation agent into binary oxide of one or more elements of the groups Ib, IIa, IIb, IIIa, IIIb, IVa, IVb, Va, Vb, VIa, VIb, VIIb, VIII of the periodic table as well as of the lanthanides and actinides.

11 Claims, No Drawings

METHOD OF MANUFACTURING A FINE MONODISPERSE OXIDE POWDER, A FINE MONODISPERSE OXIDE POWDER, A CERAMIC COMPOSITION AND THEIR USE OF SAME

BACKGROUND OF THE INVENTION

The invention relates to a method of manufacturing a fine, monodisperse powder of the binary oxidic compounds of one or more elements of the groups Ib, IIa, IIb, IIIa, IIIb, IVa, IVb, Va, Vb, VIa, VIb, VIIb, VIII of the periodic table as well as of the lanthanides and actinides. The invention further relates to a fine, monodisperse powder of the binary oxidic compounds of one or more elements of the groups Ib, IIa, IIb, IIIa, IIIb, IVa, IVb, Va, Vb, VIa, VIb, VIIb, VIII of the periodic table as well as of the lanthanides and actinides, and to a ceramic composition comprising a fine, monodisperse oxide powder and the use of said powder and composition.

Fine, monodisperse oxide powders are necessary for the manufacture of ceramic compositions for electronic ceramics. The degree of fineness, the size distribution and the purity of the powder particles used are parameters which are crucial for the reactivity and sinterability of the powders. This applies, in particular, to the manufacture of miniaturized, electronic components, for example ceramic capacitors, varistors or actuators having a multilayer structure. Fine, monodisperse powders are also needed to manufacture pastes for screen-printing of ceramic layers in thick-film technology or for providing thin ceramic layers on substrates from colloidal suspensions.

In particular, if only small quantities of oxides must be admixed as dopants with other oxides, the particle size and the degree of dispersion or agglomeration of the powders are of decisive importance to the homogeneous distribution of the dopant in the starting material. It has long been known to those skilled in the art that flawless and reproducible doping in electronic ceramics can only be attained by using fine, monodisperse powders having grain sizes in the micron and sub-micron ranges.

However, great difficulties are attached to the preparation of fine, monodisperse oxide powders having the above-mentioned grain sizes. During calcining a known precursor for oxides, for example carbonates, oxalates, hydroxides, or during spray drying and flash roasting solutions, sols and gels, irregularly shaped aggregates of particles which are composed of numerous crystallites are always formed. When such aggregates are comminuted by grinding, powders having a wide particle size or agglomerate size distribution are obtained, which are rather unsuitable for doping. Besides, in the sub-micron range, monodisperse powders cannot be obtained by classification (sieving, air separation). In addition, abrasion of the grinding members leads to contamination of the powders during grinding. Consequently, sub-micron powders cannot be obtained by reducing the size of the powders, but must be manufactured by means of direct methods. Direct methods include, for example, thermal decomposition in plasma, reaction-spray sintering or gas-phase synthesis. However, these manufacturing technologies require high investments in production facilities.

SUMMARY OF THE INVENTION

For this reason, it is an object of the invention to provide a simple method of manufacturing a fine, monodisperse powder of the binary oxidic compounds of one or more elements of the groups Ib, IIa, IIb, IIIa, IIIb, IVa, IVb, Va, Vb, VIa, VIb, VIIb, VIII of the periodic table as well as of the lanthanides and actinides.

In accordance with the invention, this object is achieved by a method which is characterized in that a graphite intercalation compound is manufactured by reacting one or more chemical starting compounds of one or more elements of the groups Ib, IIa, IIb, IIIa, IIIb, IVa, IVb, Va, Vb, VIa, VIb, VIIb, VIII of the periodic table as well as of the lanthanides and actinides with a graphite of a grain size$\leq 150$ μm (mesh size), the graphite intercalation compound is converted by an oxidation agent into binary oxide of one or more of the elements of the groups Ib, IIa, IIb, IIIa, IIIb, IVa, IVb, Va, Vb, VIa, VIb, VIIb, VIII of the periodic table as well as of the lanthanides and actinides.

This method has the advantage that a fine, monodisperse powder of the binary oxidic compounds of one or more elements of the groups Ib, IIa, IIb, IIIa, IIIb, IVa, IVb, Va, Vb, VIa, VIb, VIIb, VIII of the periodic table as well as of the lanthanides and actinides can be obtained in small batches, without the necessity of high investments in production facilities. The oxide powder obtained has a high purity, is sinter-active and has a uniform grain size distribution.

In accordance with a preferred embodiment of the invention, flake graphite having a grain size$\leq 50$ μm (mesh size) is used as the graphite. As a result, a particularly fine, monodisperse oxide powder having a grain size$\leq 0.75/$μm$\pm 0.005$ μm is obtained.

In accordance with a further preferred embodiment, for the graphite intercalation compound use is made of a ternary graphite intercalation compound of two elements of the groups Ib, IIa, IIb, IIIa, IIIb, IVa, IVb, Va, Vb, VIa, VIb, VIIb, VIII of the periodic table as well as of the lanthanides and actinides. In this manner an oxide powder can be manufactured which is an extremely homogeneous mixture of two different binary oxidic compounds of the elements of the groups Ib, IIa, IIb, IIIa, IIIb, IVa, IVb, Va, Vb, VIa, VIb, VIIb, VIII of the periodic table as well as of the lanthanides and actinides.

Advantageously, for at least one starting compound use is made of a nitrate or oxynitrate of one or more elements of the groups Ib, IIa, IIb, IIIa, IIIb, IVa, IVb, Va, Vb, VIa, VIb, VIIb, VIII of the periodic table as well as of the lanthanides and actinides. The nitrate or oxynitrate intercalation compound can be decomposed at low temperatures and no residues remain in the finished, fine, monodisperse oxide powder.

In accordance with a particularly preferred embodiment, the method is characterized in that niobium-oxynitrate $NbO(NO_3)_3$ is used as the starting compound and flake graphite having a grain size<50 μm (mesh size) is used as the graphitic carbon modification. The niobium pentoxide thus obtained has a grain size<1/μm, is spherical and can readily be dispersed.

The invention further relates to a fine, monodisperse oxide powder of the binary oxidic compounds of one or more elements of the groups Ib, IIa, IIb, IIIa, IIIb, IVa, IVb, Va, Vb, VIa, VIb, VIIb, VIII of the periodic-table as well as of the lanthanides and actinides, which oxide powder is manufactured in accordance with a method according to the invention.

This oxide powder has a particle size$\leq 2$ μm, is little aggregation and can readily be dispersed.

The invention further relates to a ceramic composition which comprises a fine, monodisperse powder of the binary oxidic compounds of one or more elements of the groups Ib, IIa, IIb, IIIa, IIIb, IVa, IVb, Va, Vb, VIa, VIb, VIIb, VIII of the periodic table as well as of the lanthanides and actinides, and which powder optionally comprises one or more additional oxides and ceramic auxiliary substances.

These additional oxides may be binary oxidic compounds, but also ternary, quaternary or oxides of higher multiple. Such a ceramic composition has a high sinter activity. By virtue of the degree of fineness and the spherical shape of the grains of the inventive oxide powder, only a small quantity of a binder is needed. By virtue thereof, the firing process of such ceramic compositions is made easier.

In a further preferred embodiment the ceramic composition is characterized in that it comprises niobium pentoxide for the fine, monodisperse oxide powder, barium titanate for the additional oxide and ceramic auxiliary materials, for example sintering agents, grain growth inhibiting agents and/or permanent binders.

Such a ceramic composition comprising <0.2 mol % of $Nb_2O_5$ (relative to Nb), $BaTiO_3$ as well as ceramic auxiliary substances is particularly suitable for the manufacture of a PTC thermistor. Another composition comprising $Nb_2O_5$ in a quantity $\geq 0.5$ mol % (relative to Nb), $BaTiO_3$ as well as ceramic auxiliary substances can very suitably be used for the manufacture of a highly insulative, dielectric ceramic.

in such lamellar compounds may vary as function of the number of separating carbon layers.

For example, the following elements or their compounds can be used for the preparation of graphite intercalation compounds: Cu, Au, Be, Mg, Zn, Cd, Hg, Al, Ga, In, Tl, Si, Sn, Sb, Bi, Ti, Zr, Hf, Sb, Bi, V, Nb, Ta, Te, Cr, Mo, W, Mn, Re, Fe, Co, Ni, Pd, Pt, Sm, Eu, Gd, Tb, Dy, Ho, Er, Tm, Yb, Lu and U.

For the manufacture of the graphite intercalation compound, compounds of one or more metals of the groups Ib, IIa, IIb, IIIa, IIIb, IVa, IVb, Va, Vb, VIa, VIb, VIIb, VIII of the periodic table as well as of the lanthanides and actinides are intercalated into a graphite. These compounds may include fluoride, chloride, nitrate, oxynitrate etc.

Graphite intercalation compounds of nitrates or oxynitrates exhibit a more favourable calcination behaviour than graphite intercalation compounds of halogenides. However, halogenides may alternatively be used. A nitrate does not always also form a graphite intercalation compound, only the elements which form covalent, anhydrous nitrates and oxynitrates do.

Table 1 lists the elements which can be used for the manufacture of graphite intercalation compounds of nitrates or oxynitrates and which can be converted, in accordance with the invention, into a fine-grain oxide powder.

TABLE 1

| $[Al]_N$ | | | | | | | | |
|---|---|---|---|---|---|---|---|---|
| $[Ti]_N$ | $[V]_{ON}$ | $[Cr]_{ON}$ | $[Fe]_N$ | $[Co]_N$ | $[Cu]_N$ | $[Zn]_N$ | $[Ga]_N$ | $[Ge]_N$ |
| $[Zr]_N$ | $[Nb]_{ON}$ | $[Mo]_{ON}$ | $[Pd]_N$ | $[In]_N$ | $[Sn]_N$ | | | |
| $[Hf]_N$ | $[Ta]_{ON}$ | $[W]_{ON}$ | $[Re]_{ON}$ | | | | | |

$[\ ]_N$ = Nitrate
$[\ ]_{ON}$ = Oxynitrate

A further aspect of the invention relates to the advantageous use of the inventive ceramic composition for the manufacture of electronic components. This has the advantage that, as a result of the limited tendency to agglomerate and the satisfactory dispersability of the inventive oxide powder, local variations in the concentration of the dopant and the resultant changes in the properties of the substances are precluded in these ceramic compositions.

The invention further relates to the use of the inventive composition for the manufacture of ceramic pastes. Very fine-grain, ceramic compositions are often required to form ceramic pastes which are used for screen printing ceramic layers in the thick-film technology or for screen printing thin ceramic layers on substrates. The composition in accordance with the invention can very suitably be used for this purpose.

DESCRIPTION OF THE PREFERRED EMBODIMENTS

The invention will be explained in greater detail by means of two examples.

"Graphite-intercalation compounds" (GIC) are interstitial compounds of foreign atoms, foreign molecules or foreign ions in graphite. Today, more than 350 graphite-intercalation compounds are known. For references, see Chemical Abstracts of the American Chemical Society. They are characterized by the fact that the foreign atoms, foreign molecules or foreign ions are included, sometimes in stoichiometric ratios, as an intermediate layer between the carbon layers of the graphite lattice. The degree of occupation of the foreign atoms, foreign molecules or foreign ions To prepare mixtures of two binary oxidic compounds, ternary graphite intercalation compounds are required. Ternary graphite intercalation compounds are either Co intercalation compounds having mixed intercalated layers or Bi intercalation compounds having an alternating, intercalated layer sequence. Ternary graphite-intercalation compounds are, for example, $AlCl_3$—$FeCl_3$—GIC, $[C_{8.52}CoCl_2]$ $(NbF_5)_{0.89}$ and $C_{22}CuAl_2Cl_8$.

Ternary graphite intercalation compounds can be manufactured by Co intercalation of compounds of two different elements into graphite or by converting a binary graphite intercalation compound into a ternary compound.

For intercalation use must be made of highly oriented graphites. For example, use can be made of highly graphitic pyrographites. This graphite is of a high purity and hence very suitable for the manufacture of oxide powder which must be very pure. A further highly graphitic carbon modification which is often used is flake graphite, i.e. highly purified natural graphite. It is alternatively possible to use a highly graphitized electrographite.

Several methods of manufacturing graphite-intercalation compounds are known.

Halogenide-graphite compounds are usually manufactured by heating graphite and the typical halogenide in a chlorine atmosphere in sealed ampoules. The temperatures range is between 200° and 500° C. If volatile gas-phase complexes of the halogenide with $AlCl_3$ are formed, the reaction can be facilitated substantially by adding small quantities of $AlCl_3$. It is alternatively possible to intercalate halogenides from a solution. Preferably, solutions in thionylchloride are used.

For the manufacture of nitrate-graphite intercalation compounds, first, the anhydrous nitrates or oxynitrates of the elements must be prepared. This can be carried out, for example, by reacting the elements with $N_2O_4$ dissolved in ethyl acetate. In accordance with another known method, commercially available chlorides and an excess of nitrogen pentoxide ($N_2O_5$) are introduced into a Schlenk tube, while excluding air and moisture, and are allowed to stand for several days at room temperature.

To manufacture the nitrate-graphite intercalation compounds, graphite is brought into contact, under a protective gas, with a nitrate melt which contains the nitrate of the desired element.

In accordance with another method, the graphite and condensed $N_2O_5$ as the dispersing and dissolving agent are mixed in a Schlenk tube from which air and moisture are excluded and nitrate or oxynitrate is added. Said mixture is tempered for several days at an increased temperature, while excluding air and moisture. Under certain conditions, the reaction can be accelerated by a reaction in a fluid bed. Following this reaction, the product is washed with anhydrous nitromethane to remove the excess $N_2O_5$ and nitrate, after which it is dried.

For the manufacture of mixtures of two binary oxidic compounds, use must be made of ternary graphite intercalation compounds. Ternary graphite intercalation compounds may be Co intercalation compounds, i.e. they comprise mixed intercalated layers, or they may be Bi intercalation compounds, i.e. they comprise alternating intercalated layers. Examples of ternary graphite-intercalation compounds are $AlCl_3$—$FeCl_3$—GIV, $C_{8.52}CoCl_2$ $(NbF_5)_{0.89}$ and $C_{22}CuAl_2Cl_{18}$.

Ternary graphite intercalation compounds can be manufactured by the joint intercalation of compounds of two elements into graphite or by converting a binary graphite-intercalation compound into a ternary compound.

By oxidizing the graphite intercalation compound with an oxidizing agent at calcining temperatures which are as low as possible, this compound is converted in accordance with the invention into a fine, monodisperse oxide powder.

For the oxidation agent use can be made of oxygen-containing gases, such as oxygen itself, moist oxygen or air. It is alternatively possible to use oxidizing salt melts, such as molten $KNO_3$.

The calcining temperatures of the graphite intercalation compounds are in the range from 500° C.–1000° C. The graphite intercalation compounds, which comprise the known graphite oxidation catalysts vanadium or chromium, can be oxidized at lower temperatures than graphite intercalation compounds comprising oxidation inhibiting agents such as silicon or aluminum.

A particularly mild oxidation process is obtained when it is carried out in a fluid bed.

1. Exemplary embodiment:

In this exemplary embodiment a description is given of the manufacture of fine, monodisperse niobium pentoxide ($Nb_2O_5$).

1.1 Manufacture of niobium-oxynitrate

Commercially available niobium pentachloride ($NbCl_5$) together with an excess of nitrogen pentoxide ($N_2O_5$) is introduced into a Schlenk tube, while excluding air and moisture, and is allowed to stand for several days at room temperature. In this manner, pure white $NbO(NO_3)_3$ is formed.

1.2 Manufacture of niobium-oxynitrate-graphite-intercalation compound

A quantity of 1 g of flake graphite having an average grain size<50 μm (mesh size) and condensed $N_2O_5$ (nitrogen pentoxide) as the dispersing and dissolving agent are mixed in a Schlenk tube, while excluding air and moisture, and 2.5 g of $NbO(NO_3)_3$ is added to this mixture. Said mixture is tempered for 142 hours at 60° C., while excluding air and moisture. In this process, the intercalation reaction of the Nb $(NO_3)_3$ into the graphite takes place.

Following this reaction, the excess $N_2O_5$ and $NbO(NO_3)_3$ are removed from the product by washing with dried nitromethane, whereafter the product is dried in air at 110° C.

1.3. Pyrohydrolysis to form $Nb_2O_5$

Approximately 1 g of the graphite intercalation compound of $NbO(NO_3)_3$ is introduced into a quartz boat and slowly heated in a moist oxygen stream at a rate of 3° C./min. to 300° C., which temperature is maintained for approximately 0.5 hours. The temperature is then increased to 950° C.–1000° C. within 4 hours, which maximum temperature is maintained for 0.5 hours. Subsequently, the product is allowed to cool to room temperature in a dry oxygen stream.

The $Nb_2O_5$ powder thus obtained consists of regularly shaped, monodisperse spherical particles having an average grain size of 0.125±0.02 μm. It shows little tendency towards agglomeration and, hence, can readily be dispersed in an aqueous suspension.

2. Exemplary embodiment 2.1 Manufacture of $[C_{8.52}CoCl_2]$ $(NbF_5)_{0.89}$

A quantity of 1 g of flake graphite having an average grain size of 50 μl (mesh size) and condensed $Cl_2$ as the dispersing and dissolving agent are mixed in a Schlenk tube, while excluding air and moisture, and 2.5 g of $CoCl_2$ is added to said mixture. Said mixture is tempered at 500° C., while excluding air and moisture. In this process, the intercalation reaction of $CoCl_2$ into the graphite takes place.

Following said reaction, the excess $CoCl_2$ is removed from the product by washing with diluted $HNO_3$ and $H_2O$, whereafter the product is dried in air at 110° C.

2.2 Conversion into a ternary compound

The binary graphite intercalation compound $C_{8.52}CoCl_2$ thus obtained is converted into a ternary compound by introducing it into a horizontal reactor, mixing it with niobium powder and maintaining it at a temperature of 120° C. for 10 hours while exposing it to a slow fluorine stream. In this manner, intermediate $NbF_5$ is formed which evaporates and bi-intercalates. This results in the formation of $[C_{8.52}CoCl_2]_{(NbF_5)}0.89$.

2.3 Oxidation

In the same reactor, $[C_{8.52}CoCl_2]$ $(NbF_5)0.89$ is subsequently slowly heated in a moist oxygen stream at a rate of 3° C./min. to 300° C., at which temperature it is maintained for approximately 0.5 h. The temperature is then increased to 950° C.–1000° C. within 4 hours, and the product is maintained at this maximum temperature for 0.5 h. Subsequently, the product is cooled to room temperature in a dry oxygen stream. The mixture of CoO and $Nb_2O_5$ thus obtained comprises both binary oxidic compounds in a homogeneous distribution. The primary crystallites form soft, monodisperse agglomerates having an average grain size of 2±0.02 μm.

We claim:

1. A method of manufacturing a fine, monodisperse powder of binary oxidic compounds of at least one metal selected from the group consisting of the groups Ib, IIa, IIb, IIIa, IIIb, IVa, IVb, Va, Vb, VIa, VIb, VIIa, VIIb, VIII of the periodic table, the lanthanides and the actinides comprising:

a) forming a graphite intercalation compound of said at least one metal by reacting at least one compound of said at least one metal with a graphite having a particle size $\leq 150$ μm, and b) heating the resultant graphite intercalation compound at a temperature of 500° C.–1000° C. under oxidizing conditions for a time sufficient to convert said graphite intercalation compound into a binary oxidic compounds of said at least one metal.

2. A method as claimed in claim 1 wherein the graphite is flake graphite having a grain size $\leq 50$ μm.

3. The method of claim 2 wherein the graphite intercalation compound is a ternary graphite intercalation compound of two of said metals.

4. The method of claim 2 wherein said at least one compound is a nitrate or an oxynitrate.

5. A method as claimed in claim 1, characterized in that said at least one starting compound is niobium oxynitrate $NbO(NO_3)_3$ and the graphite is a flake graphite having a grain size $\leq 50$ μm.

6. A method as claimed in claim 2, characterized in that the graphite intercalation compound is a ternary graphite intercalation compound of two metals of the groups Ib, IIa, IIb, IIIa, IIIb, IVa, IVb, Va, Vb, VIa, VIb, VIIb, VIII of the periodic table as well as of the lanthanides and actinides.

7. A method as claimed in claim 2, characterized in that at least one starting compound consists of a nitrate or oxynitrate of one or more metals of the groups Ib, IIa, IIb, IIIa, IIIb, IVa, IVb, Va, Vb, VIa, VIb, VIIb, VIII of the periodic table as well as of the lanthanides and actinides.

8. A method as claimed in claim 3, characterized in that at least one starting compound consists of a nitrate or oxynitrate of one or more metals of the groups Ib, IIa, IIb, IIIa, IIIb, IVa, IVb, Va, Vb, VIa, VIb, VIIb, VIII of the periodic table as well as of the lanthanides and actinides.

9. A method as claimed in claim 2, characterized in that said at least one starting compound is niobium oxynitrate $NbO(NO_3)_3$ and the graphite is a flake graphite having a grain size $\leq 50$ μm.

10. A method as claimed in claim 3, characterized in that said at least one starting compound is niobium oxynitrate $NbO(NO_3)_3$ and the graphite is a flake graphite having a grain size $\leq 50$ μm.

11. A method as claimed in claim 4 characterized in that said at least one starting compound is niobium oxynitrate $NbO(NO_3)_3$ and the graphite is a flake graphite having a grain size $\geq 50$ μm.

* * * * *